United States Patent [19]

Ayuta et al.

[11] Patent Number: 5,046,252
[45] Date of Patent: Sep. 10, 1991

[54] CUTTER FOR OPTICAL FIBERS

[75] Inventors: Tokuichi Ayuta; Kazuhiro Ohtsuki, both of Tokyo, Japan

[73] Assignee: Daiichi Denshi Kogyo Kabushiki Kaisha, Japan

[21] Appl. No.: 512,945

[22] Filed: Apr. 23, 1990

[30] Foreign Application Priority Data

Apr. 28, 1989 [JP] Japan .............................. 1-50837[U]

[51] Int. Cl.⁵ ...................... B26B 13/00; H01R 43/00
[52] U.S. Cl. .................................... 30/258; 29/566.4; 30/278; 81/9.44; 83/955
[58] Field of Search ....................... 30/278, 282, 258; 29/566.4; 81/9.44; 83/608, 609, 955

[56] References Cited

U.S. PATENT DOCUMENTS

| 775,699 | 11/1904 | Calhoon | 30/258 X |
| 2,195,353 | 3/1940 | Atchison | 30/258 |
| 4,713,874 | 12/1987 | Schwartz | 29/566.4 |
| 4,736,501 | 4/1988 | Fujimoro | 81/9.44 |

Primary Examiner—Z. R. Bilinsky
Attorney, Agent, or Firm—Silverman, Cass & Singer

[57] ABSTRACT

A cutter for optical fibers includes upper and lower frames pivotally connected at their ends pivotally movably relative to each other, a cutting blade provided on the upper frame for cutting optical fibers and supporting device provided on the lower frame for supporting an optical fiber to be cut. The upper frame includes a regulating device for moving the cutting blade in its longitudinal direction and stopping and fixing the cutting blade and a confirming device for visibly confirming a position where the cutting blade is fixed. With this arrangement, there is no need for exchanging of cutting blades every cutting of a fiber. Moreover, a cutting blade portion to be used can be visibly identified and it can be prevented to use again once used cutting edge portion of the cutting blade.

8 Claims, 7 Drawing Sheets

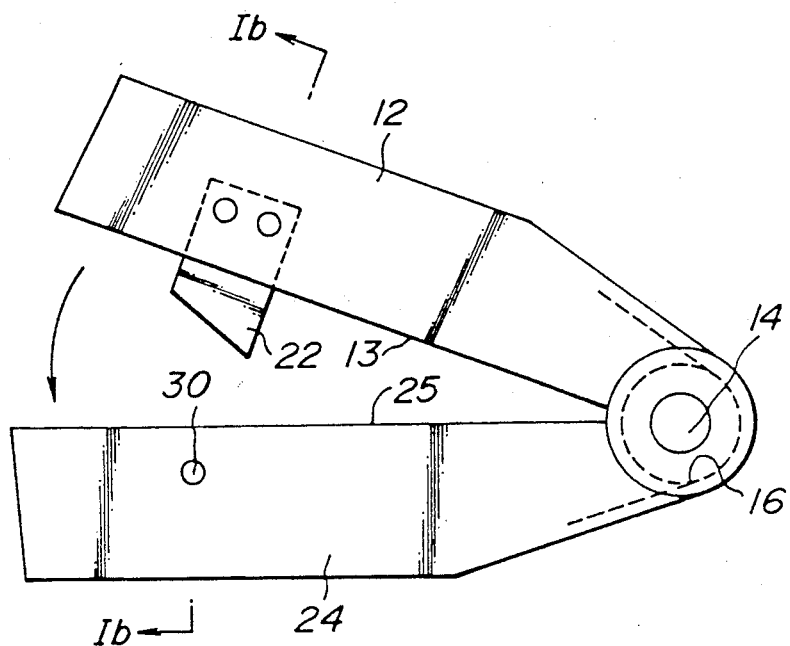
FIG_1a
PRIOR ART
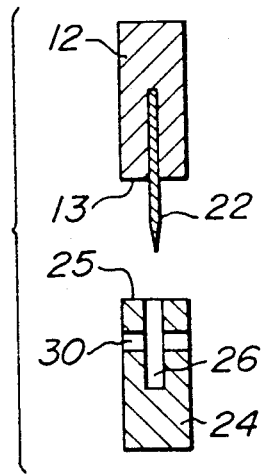
FIG_1b
PRIOR ART
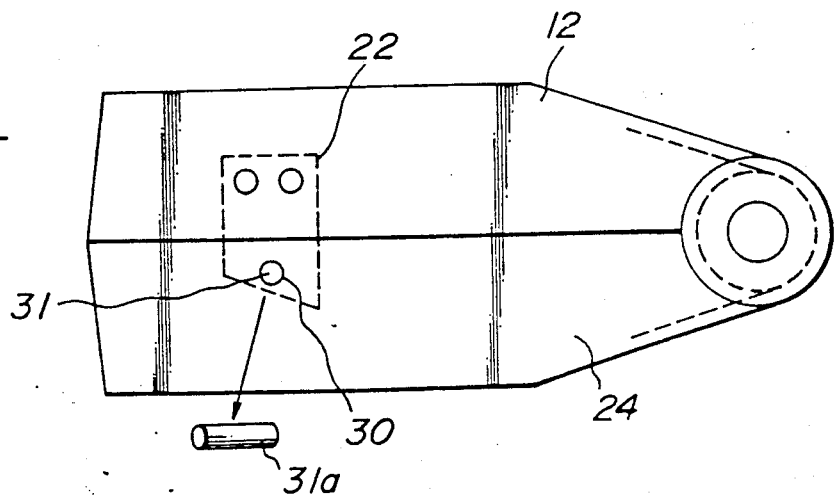
FIG_1c
PRIOR ART

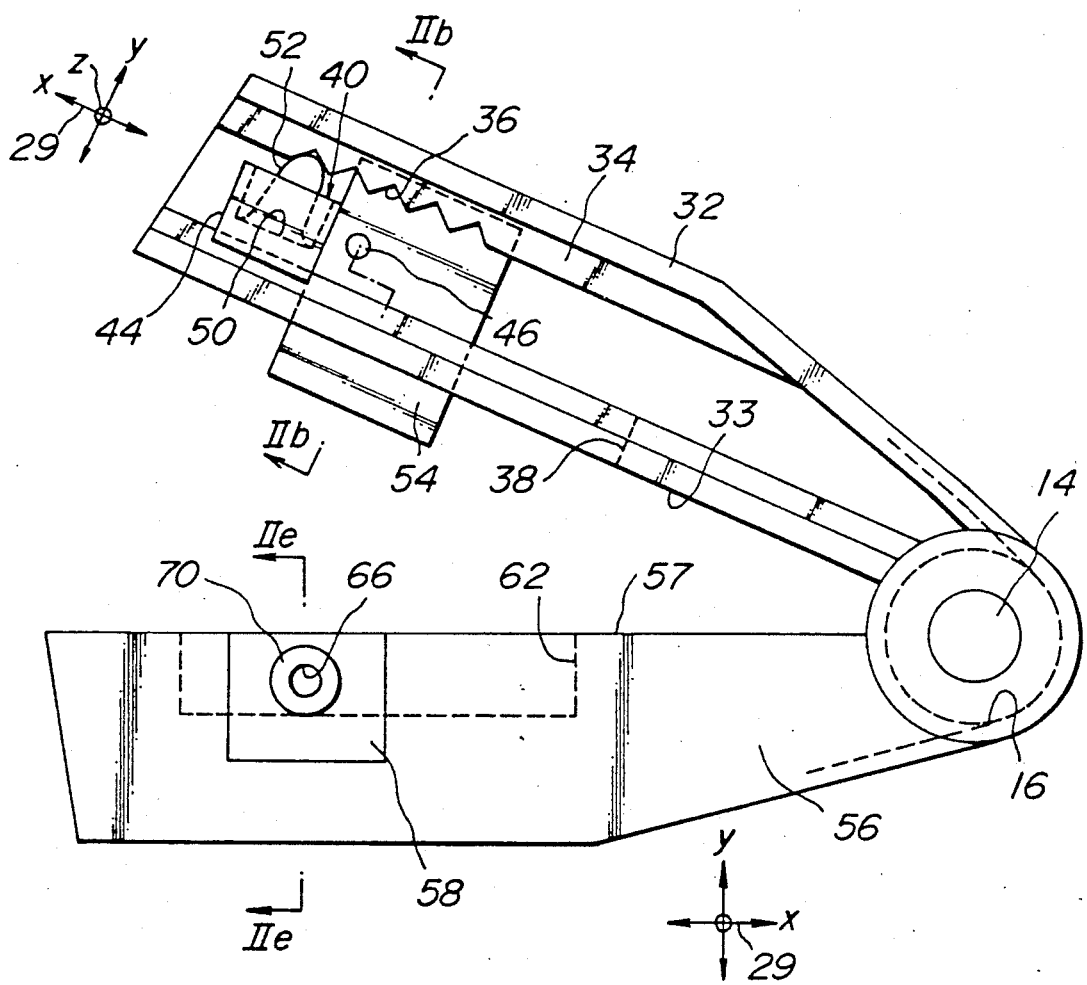
FIG_2a

FIG._2b
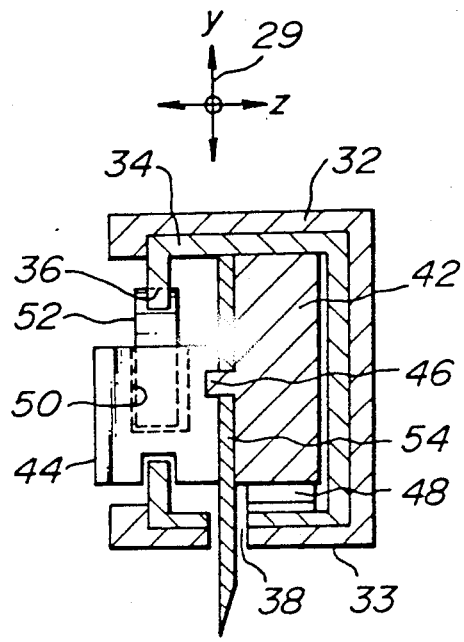
FIG._2c
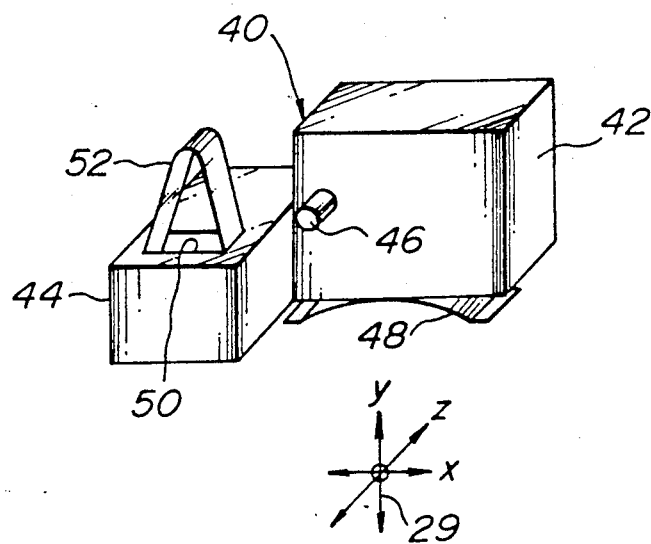

FIG_2d
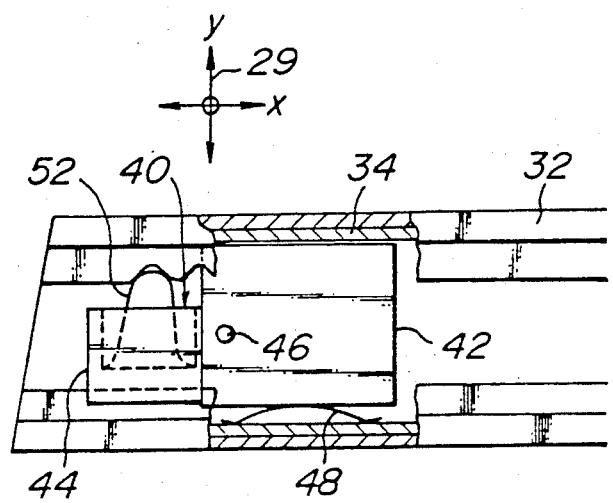
FIG_2e
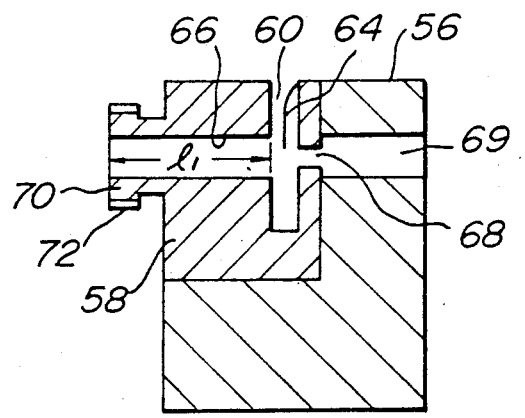
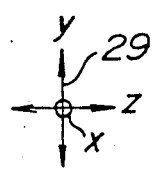

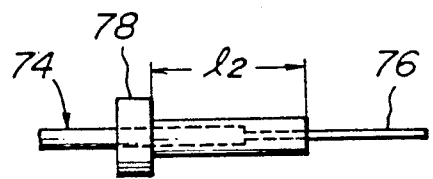
FIG_3a
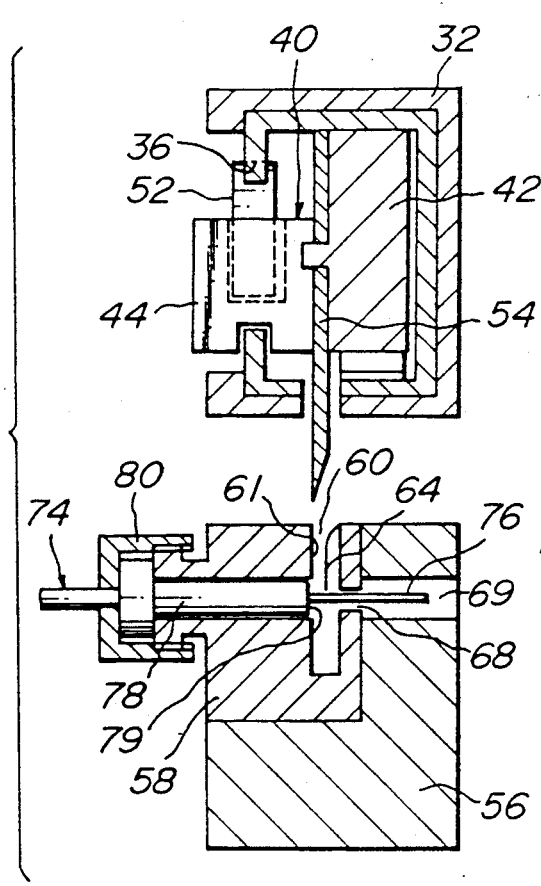
FIG_3b
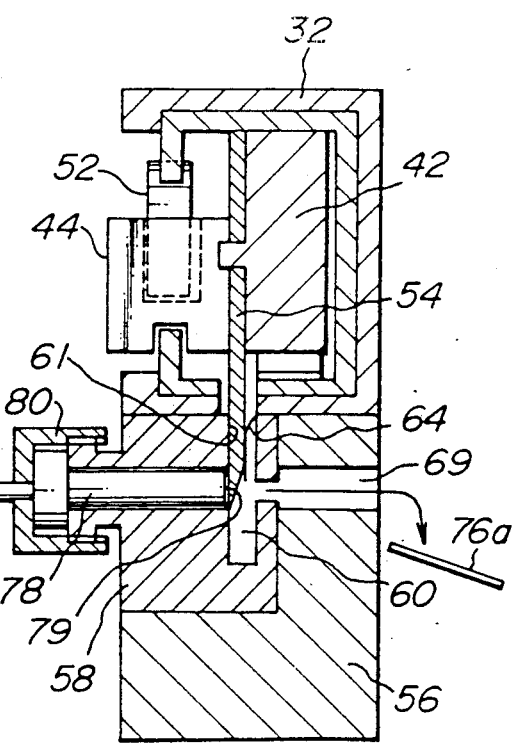
FIG_3c

FIG_3d
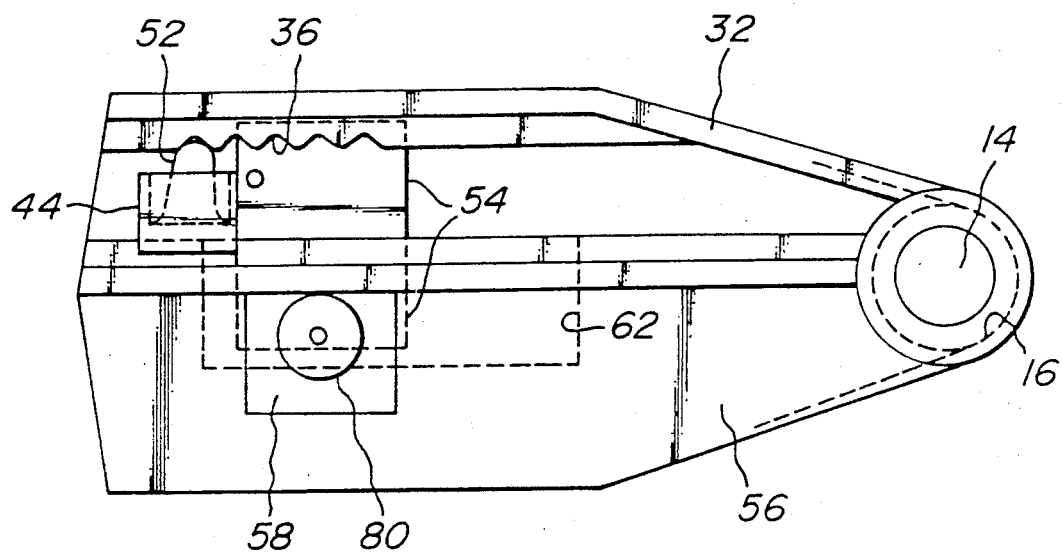
FIG_4
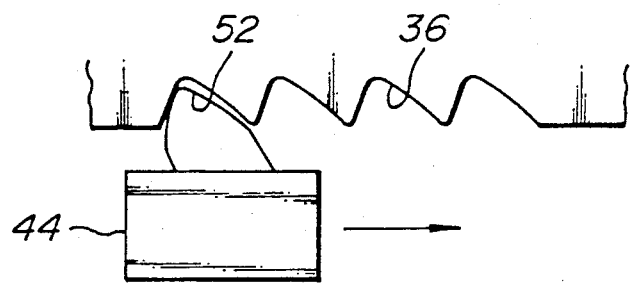

FIG_5
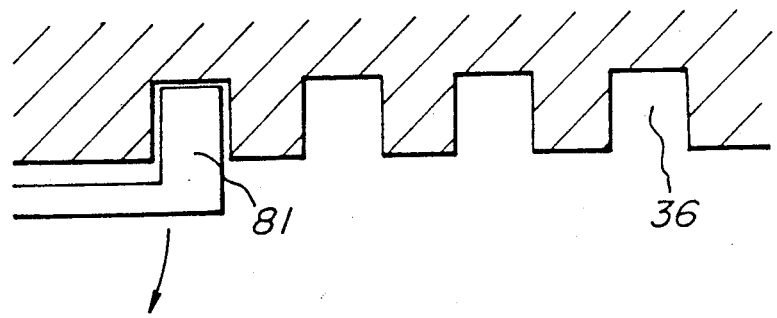
FIG_6a
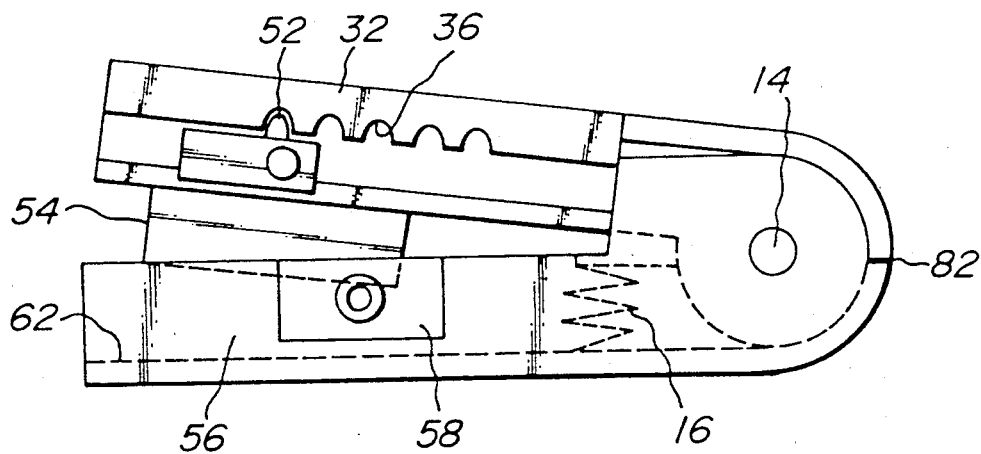
FIG_6b
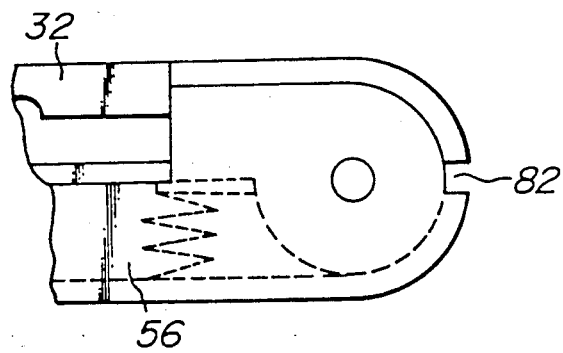

CUTTER FOR OPTICAL FIBERS

BACKGROUND OF THE INVENTION

This invention relates to a cutter for optical fibers made of a plastics.

One example of such a cutter for optical fibers is shown in FIGS. 1a-1c. The cutter includes an upper frame 12 and a lower frame 24 whose ends are pivotally connected by a pin 14 as shown in FIGS. 1a and 1c (the upper and lower relation therebetween is referred to the drawings). The upper and lower frames 12 and 24 are provided with abutting surfaces 13 and 25 adapted to abut against each other when pivotally moved toward each other.

A spring 16 shown in broken lines urges the upper and lower frames 12 and 24 away from each other. The upper frame 12 is provided with a cutting blade 22 having a cutting edge extending from the abutting surface 13 of the upper frame 12. The lower frame 24 is formed with a groove 26 for receiving the cutting blade 22 of the upper frame 12. The lower frame 24 is further formed with an insert aperture 30 which intersects the groove 26 and will support an optical fiber 31 to be cut at right angles to the cutting edge of the blade 22.

With this arrangement, after the optical fiber 31 has been inserted in the insert aperture 30, the upper frame 12 is moved to the lower frame 24 (FIG. 1c) so that the optical fiber 31 is cut by the cutting blade 22. Reference numeral 31a denotes a cut waste piece of the optical fiber 31.

With the construction of the cutter of the prior art above described, a part of the cutting edge of the cutting blade 22 to be used for cutting optical fibers is imperatively limited to a particular point on the cutting edge because the cutting blade 22 is fixed at one location on the upper frame 12.

In cutting an optical fiber for forming one end face of the optical fiber, a satisfactory end face of the fiber could not be obtained unless a cutting edge of a cutting blade is under a particularly limited condition.

In case that several cutting blades having the same shape made of a usual carbon steel are prepared by which optical fibers are cut by way of experiment, some of them are able to be used for cutting fibers more than ten times, while some of them become dull only after cutting once or twice. It is clear from this fact that cutting result is greatly affected by finely slight change in condition of cutting edge. Accordingly, a cutting edge of a cutting blade and a cut result of optical fibers are in a delicate relation.

Under such circumstances, in order to form end faces of optical fibers by the use of the technique of the prior art above described, a cutting blade must be exchanged every cutting of one fiber. This is inefficient.

SUMMARY OF THE INVENTION

It is an object of the invention to provide a cutter for optical fibers which eliminates all the disadvantages of the prior art and is able to form cut end faces of optical fibers immediately usable as connecting faces of optical connectors with less connecting losses without requiring exchanging of a cutting blade every cutting of one fiber.

In order to accomplish the above object, in a cutter for optical fibers including two frames pivotally connected at their ends pivotally movably relative to each other, a cutting blade provided on one of the frames for cutting optical fibers and means provided on the other frame for supporting an optical fiber to be cut, according to the invention said frame having the cutting blade comprises regulating means for moving the cutting blade in its longitudinal direction and stopping and fixing the cutting blade and confirming means for visibly confirming a position where the cutting blade is fixed.

The invention will be more fully understood by referring to the following detailed specification and claims taken in connection with the appended drawings.

BRIEF DESCRIPTION OF THE DRAWINGS

FIG. 1a is an explanatory view of a cutter of the prior art whose upper and lower frames are opened;

FIG. 1b is an explanatory sectional view taken along the line Ib—1b in FIG. 1a;

FIG. 1c is an explanatory view of the cutter shown in FIG. 1a whose frames are closed;

FIG. 2a is an explanatory view of a cutter according to the invention whose upper and lower frames are opened;

FIG. 2b is an enlarged explanatory sectional view taken along the line IIb—IIb in FIG. 2a;

FIG. 2c is an explanatory view of a cutter guide shown in FIG. 2b;

FIG. 2d is an explanatory view of the cutter guide after removal of a cutting blade;

FIG. 2e is a sectional view taken along the line IIe—IIe in FIG. 2a;

FIG. 3a is an explanatory view of an optical fiber cord having a ferrule secured at its forward end;

FIGS. 3b and 3c are explanatory views illustrating sequential cutting the fiber;

FIG. 3d is an explanatory view of the cutter shown in FIG. 2a whose frames are closed;

FIG. 4 is an explanatory view illustrating a modification of regulating means according to the invention;

FIG. 5 is an explanatory view illustrating another modification of the regulating means;

FIG. 6a is an explanatory view of another embodiment of the cutter according to the invention having a stopper limiting the opening the frames; and FIG. 6b is an explanatory view of the cutter shown in FIG. 6a whose frames are closed.

DESCRIPTION OF THE PREFERRED EMBODIMENTS

A cutter according to the invention will be explained in detail with one embodiment for cutting a fiber 76 extending from a ferrule 78 secured to a forward end of a plastic optical fiber cord 74 as shown in FIG. 3a.

The cutter comprises an upper frame 32 and a lower frame 56 pivotally connected by a pin 14 and urged away from each other by means of a spring 16. Reference numerals 33 and 57 denote abutting surfaces of the upper and lower frames 32 and 56, respectively. For the sake of clarity of explanation, three directions x, y and z are determined as shown by arrows in the drawings.

(1) Upper frame 32

The upper frame 32 has a cross-section, for example, C-shaped as shown in FIG. 2b and includes a guide rail 34 made of, for example a stainless steel, fitted therein having likewise a C-shaped cross-section. The upper frame 32 and the guide rail 34 may be integrally formed by a plastics. The guide rail 34 is formed at an upper edge with recesses 36 (for example five recesses). The upper frame 32 and guide rail 34 are formed in their lower portions with elongated slits 38 extending in directions x (FIG. 2b).

A cutter guide 40 is provided in the guide rail 34 (FIG. 2c). The cutter guide 40 is formed by blocks 42 and 44 integrally constructed. The block 42 is provided with a pin 46 extending in a direction z for mounting a cutting blade 54 later described. Moreover, the block 42 has a spring 48 secured thereto.

The block 44 is formed with an aperture 50 for supporting a spring 52 therein. The spring 52 has an inverted V-shaped upper end extending upwardly from an upper surface of the block 44.

A cutting blade 54 is secured to a side face of the block 42 by means of the pin 46. The cutter guide 40 together with the cutting blade 54 secured thereto is fitted in the guide rail 34 of the upper frame 32 (FIG. 2a). A cross-section of the upper frame 32 taken along the line IIb—IIb in FIG. 2a is shown in FIG. 2b, while FIG. 2d illustrates the cutter guide 40 in the guide rail 34 after removal of the cutting blade 54.

The block 42 is movable in its entirety in the directions x in the guide rail 34 without any play or wobble because of the urging action of the spring 48 (FIG. 2d).

Moreover, the upper end of the spring 52 is likely to fit in one of the recesses 36 formed in the guide rail 34. If the block 44 is pushed in the direction x, for example, by a thumb of an operator to move the cutter guide 40, the spring 52 moves into the adjacent recess 36 to stop and fix the cutter guide 40 in its position with exception of a case that a particularly large force acts upon the block 44.

Therefore, the operator can regulate the cutting edge portion of the cutting blade in this manner.

The operator can readily confirm whichever recess 36 engages the spring 52 by directly looking it because of the upper portion of the spring 52 extending above the block 44 (FIGS. 2a and 2d). The cutter blade 54 extends downward through the elongated slit 38 below the abutting surface 33.

(2) Lower frame 56

The lower frame 56 is provided with a connector guide 58 fitted therein for holding the ferrule 78 (FIGS. 2e and 3b). The connector guide 58 is made of, for example, a stainless steel and can be replaced with another one according to change in size of the ferrule 78 and connecting system (bayonet, screw and other types) for connecting a connector. The connector guide 58 is formed in an upper surface with a slit 60 in a plane including directions x and y for receiving the cutting blade 54.

The lower frame 56 is formed with a slit 62 above the slit 60 in the direction x (FIG. 2a) for receiving part of the cutting blade 54. Reference numeral 64 denotes a spring whose function will be explained later (FIG. 2e).

The connecting guide 58 is formed with an aperture 66 having a circular cross-section and extending in the direction z for inserting the ferrule 78. A length $l_1$ of the aperture 66 is substantially equal to a length $l_2$ of the main body of the ferrule 78 ($l_2 - 0.03 \leq l_1 \leq l_2$ in this embodiment). Moreover, the lower frame 56 is formed with apertures 68 and 69 having circular cross-sections in an extending direction z of the aperture 66. The connector guide 58 is provided with an extended portion 70 in the proximity of an inlet of the circular aperture 66, and the extended portion 70 is in turn formed with, for example, screw threads 72 thereabout.

Using method of the cutter (1) An optical fiber cord 74 has a ferrule 78 secured to its forward end and a fiber 76 extends from a forward end of the ferrule 78 as shown in FIG. 3a.

The ferrule 78 is inserted into the aperture 66 of the lower frame 56 and held therein by means of a coupling or nut 80 (FIG. 3b). Since the length $l_1$ of the aperture 66 is substantially equal to the length $l_2$ of the main body of the ferrule 78 as above described, a forward end surface 79 of the ferrule 78 is substantially coincident with a guide surface 61. The fiber 76 extending from the ferrule 78 is in the apertures 68 and 69.

(2) When the upper frame 32 is lowered toward the lower frame 56, the cutting blade 54 is inserted downwardly into the slit 60. While doing so, the cutting blade 54 is urged to the guide surface 61 by an action of the spring 64, so that by the lowering of the cutting blade 54 the fiber 76 is cut at the forward end surface 79 (FIG. 3c). Reference numeral 76a denotes a cut waste piece of the fiber. For better understanding, FIG. 3d illustrates the optical fiber cutter immediately after the fiber 76 has been cut.

(3) After cutting a predetermined times (which can be experimentally determined according to a kind of the used cutter blade), the cutter guide 40 is moved so as to permit the spring 52 to engage a recess 36 adjacent the recess 36 in which the spring has engaged. Therefore, the cutting blade 54 has been moved one pitch of the recesses in the direction x. Accordingly, in cutting the fiber 76 next time, the fiber 76 will be cut by a new part of the cutting blade 54.

Other Embodiments (1) Referring to FIG. 4, recesses 36 of the guide rail 34 may be formed inclined relative to the moving direction of the cutting blade 54 as if they were ratchet teeth. With this arrangement, the cutter guide 40 is movable to the right as shown by an arrow, but unable to move to the left. Therefore, there is no longer any risk of once used part of the cutting blade 54 being used again.

(2) In order to prevent unintentional movement of the cutter blade during carrying the cutter and to more positively fix the cutting blade 54, the cutter may be so constructed that the cutting blade 54 can be moved only after an extending piece 81 has been lowered away from the recess 36 as shown in FIG. 5.

(3) It is not essential to move the cutting blade 54 intermittently. It is sufficient to prevent once used part of the cutting blade from being used again.

(4)

In the above embodiment, the spring 48 is used in order to eliminate play between the guide rail 34 and the block 42 of the cutter guide 40. However, the shape of the spring 48 is not limited to that above described. It may be any known shape.

(5) As shown in FIGS. 6a and 6b, the upper and lower frames 32 and 56 are provided with stoppers 82 to limit an opened angle between the upper and lower frames 32 and 56 to an extent such that a forward end of the cutting blade 54 does not expose out of the slit 62. A cutting edge can be protected, and safety in handling the cutter is also improved.

As can be seen from the above description, according to the invention the frame having the cutting blade is provided with means for moving the cutting blade in its longitudinal direction and stopping and fixing the cutting blade. Therefore, exchanging of cutting blades every cutting of a fiber is not needed.

Moreover, according to the invention means for confirming stopped positions of a cutting blade by seeing is provided so that a cutting blade portion to be used can be visibly identified and it can be prevented to again use once used cutting edge portion of the cutting blade.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A cutter for optical fibers comprising, two frames pivotally connected at their ends pivotally movable relative to each other, a cutting blade provided on one of the frames for cutting optical fibers and means provided on the other frame for supporting an optical fiber to be cut, said frame having the cutting blade including regulating means for moving the cutting blade in its longitudinal direction and stopping and fixing the cutting blade, said regulating means including guiding means having recesses, cutter guiding means slidably movable in said guiding means for supporting the cutter blade, resilient means supported by the cutter guiding means and adapted to be fitted in one of the recesses and permitted to disengage from the one recess and engage in an adjacent recess when the cutter guiding means is intentionally pushed along the longitudinal direction of the cutting blade, and confirming means for visibly confirming a position where the cutting blade is fixed.

2. A cutter for optical fibers as set forth in claim 1, wherein said guiding means is a guide rail having a C-shaped cross-section and formed at an edge with said recesses.

3. A cutter for optical fibers as set forth in claim 1, wherein said cutter guiding means comprises two blocks, one having a pin for mounting the cutter blade and the other block being formed with an aperture for supporting the resilient means.

4. A cutter for optical fiber as set forth in claim 3, wherein said the other block has a spring secured thereto to eliminate play between the guiding means and cutter guiding means.

5. A cutter for optical fibers as set forth in claim 1, wherein said resilient means has an inverted V-shaped upper end extending upwardly from a surface of the cutter guiding means to fit in one of the recesses of the guiding means.

6. A cutter for optical fibers as set forth in claim 1, wherein said recesses of the guiding means are formed inclined relative to the longitudinal direction of the cutting blade.

7. A cutter for optical fibers as set forth in claim 1, wherein an extending piece is provided so that one part of the extending piece has to be disengaged from one of the recesses of the guiding means to permit the cutter guiding means to be moved.

8. A cutter for optical fibers as set forth in claim 1, wherein said upper and lower frames are provided with stoppers to limit an opened angle between the upper and lower frames

* * * * *

UNITED STATES PATENT AND TRADEMARK OFFICE
CERTIFICATE OF CORRECTION

PATENT NO.  : 5,046,252
DATED       : September 10, 1991
INVENTOR(S) : Tokuichi Ayuta and Kazuhiro Ohtsuki It is certified that error appears in the above-identified patent and that said Letters Patent is hereby corrected as shown below:

Column 3, line 45 should not be indented;

Column 4, lines 52-53 should be --(4) In the above embodiment, the spring 48 is used in;

Column 6, line 31, insert a period (.) after "frames".

Signed and Sealed this

Twenty-third Day of March, 1993

Attest:

STEPHEN G. KUNIN

*Attesting Officer*   Acting Commissioner of Patents and Trademarks